(12) United States Patent
Jun

(10) Patent No.: US 6,456,316 B1
(45) Date of Patent: Sep. 24, 2002

(54) APPARATUS FOR JUDGING IF CO-CHANNEL INTERFERENCE EXISTS IN DIGITAL TV RECEIVER

(75) Inventor: Jung Sig Jun, Seoul (KR)

(73) Assignee: LG Electronics, Inc., Seoul (KR)

( * ) Notice: Subject to any disclaimer, the term of this patent is extended or adjusted under 35 U.S.C. 154(b) by 0 days.

(21) Appl. No.: 09/475,128

(22) Filed: Dec. 30, 1999

(30) Foreign Application Priority Data

Dec. 31, 1998 (KR) .......................................... 98/62820

(51) Int. Cl.[7] ................................................ H04N 5/38
(52) U.S. Cl. ......................... 348/21; 348/470; 348/614
(58) Field of Search ........................ 348/21, 470, 614, 348/607, 725, 726, 555; 375/346, 348, 350

(56) References Cited

U.S. PATENT DOCUMENTS

| | | | | |
|---|---|---|---|---|
| 5,715,012 A | * | 2/1998 | Patel et al. ................. | 348/555 |
| 5,886,748 A | * | 3/1999 | Lee .............................. | 348/614 |
| 5,973,725 A | * | 10/1999 | Lee .............................. | 348/21 |
| 6,108,044 A | * | 8/2000 | Shin ............................ | 348/555 |
| 6,229,560 B1 | * | 5/2001 | Jun ............................. | 348/21 |
| 6,269,133 B1 | * | 7/2001 | Lee ............................. | 375/350 |

* cited by examiner

*Primary Examiner*—Victor R. Kostak
(74) *Attorney, Agent, or Firm*—Birch, Stewart, Kolasch & Birch, LLP

(57) ABSTRACT

An apparatus for judging if a co-channel interference exists in a digital TV receiver is disclosed. The TV receiver includes a comb filter for removing NTSC interference of input data, and a selector for selectively outputting data which passed through the comb filter or data which did not pass through the comb filter according to a selection signal. The apparatus includes a gain controller for controlling the gain of noise which did not pass through the comb filter to change the point of time for turning on/off the comb filter, thereby optimizing the performance of the TV receiver for the channel noise and NTSC co-channel interference.

20 Claims, 2 Drawing Sheets

APPARATUS FOR JUDGING IF CO-CHANNEL INTERFERENCE EXISTS IN DIGITAL TV RECEIVER

BACKGROUND OF THE INVENTION

1. Field of the Invention

The present invention relates to a digital TV receiver and more particularly to an apparatus for judging if co-channel interference exists in a digital TV receiver using the vestigial sideband (VSB) mode.

2. Discussion of Related Art

According the digital television broadcasting standardized by the Grand Alliance (GA), both the digital and NTSC television systems use radio frequency (RF) signals. Also, each channel band of the digital and NTSC television system is limited to 6 MHz However, a significant difference between the digital and NTSC television system is in the transmission spectrum of the broadcasting.

In the transmission spectrum of the NTSC system, a video carrier frequency is always 1.25 MHz above the low end of a channel, a chrominance subcarrier frequency is 3.5 MHz above a video carrier signal, and a sound carrier signal has an unmodulated center frequency of 4.5 MHz higher than the video carrier frequency for the same channel. In contrast, the transmission spectrum of the DTV system only has a small pilot carrier signal with an unmodulated center frequency of 0.31 MHz to assist the carrier recovery at the receiver. Thus, the spectrum in the band is flat.

Moreover, DTV signals are coded and transmitted in a different manner from the coding and transmission methods of the analog signals for the NTSC system. Thus, a viewer generally cannot watch a NTSC broadcast with a DTV system. Nevertheless, a same tuner may be used since the DTV and NTSC system both use the same RF channel and an identical intermediate frequency (IF) band.

However, a co-channel interference may occur during the DTV broadcasting if an NTSC is broadcasted through a co-channel. The carrier powers, namely the video carriers, the chrominance subcarrier, and the sound carrier, of the NTSC system is significantly larger than the pilot signal of the DTV system, resulting in a severe interference in the DTV broadcasting. Generally, a comb filter is used to remove the co-channel NTSC interference.

The comb filter consists of delays and subtracters. Each delay consists of 12 resistors connected in series and which delay the received signal for 12 symbols to obtain the transmission characteristics suitable for filtering. The comb filter also subtracts the delayed data for 12 symbols from the current data. The carrier powers of the NTSC system is then removed by the comb filter by converging to "0" (zero). Specifically, the video carrier, chrominance carrier, and sound carrier of the NTSC system are removed because the carriers exist around the null point when passing through the comb filter, thereby avoiding interference with the DTV system.

However, using a comb filter increases the power of the random noise, resulting in a deterioration of the picture quality. Because the deterioration of the picture quality is insignificant compared to the effect of removing the NTSC channel interference, using a comb filter is still preferable. Furthermore, since the co-channel NTSC interference does not always exist, a digital TV receiver judges whether a NTSC co-channel interference exists and uses the comb filter when a co-channel NTSC interference occurs in the DTV system.

FIG. 1 is a block diagram of the DTV system. When RF signals modulated according to the VSB system are received through an antenna, a tuner 11 selects a desired channel frequency by tuning and converts the frequency into an IF signal. A frequency-phase locking loop (FPLL) 12 demodulates the IF signal from the tuner 11 into baseband signals I and Q to locks the output phase and frequency. The FPLL 12 is a circuit unifying both a frequency tracking loop and a phase-locking loop, but the frequency is locked prior to the phase.

An analog/digital (A/D) converter 13 converts the I signal into digital data of a given bit number (for example, 10 bits). The Q signal is used for carrier restoration within the FPLL 12. Using the converted digital data of a given bit number, a sync signal recovery unit 14 recovers the synchronization (sync) signal to be used for timing recovery and equalization.

The sync signal recovery unit 14 restores a data segment sync signal and a field sync signal, inserted in the RF signal by the transmission side. Namely, the standardized VSB transmission signal includes a specific sync signal patterns within the transmitted data which allows a receiver to easily recover the sync signals. Accordingly, the data incorporates consecutive data segments, wherein each segment consists of 832 symbol units and within the 832 symbol units, four symbols define the segment sync signal pattern while the other 828 symbols are data information. Also, a field consists of 313 data segments and at every 313the data segment position, a field sync signal is inserted. The segment and field sync signals are similar to a horizontal and vertical sync signals of the NTSC broadcasting signals, respectively, but do not have the same form. Because the sync signals allow an easy data recovery, an erroneous detection and recovery of the sync signals adversely affect the overall system.

An equalization & error coding correction (ECC) unit 15 uses the data segment and data field signals as training signals in an equalization. The equalization is performed to correct linear distortion of amplitude which causes interference between symbols, and to reduce ghost generated by reflection of the transmitted signal off of mountains and buildings. Afterwards, an ECC is performed to correct errors that may have occurred during transmission through the channel. A video decoder 16 decodes the equalized and error corrected signal according to the moving picture expert group (MPEG) algorithm, allowing the TV audience to watch a broadcasting through display 17.

As discussed above, a co-channel interference may occur during a DTV broadcasting. Although a comb filter may remove the co-channel interference, the use of a comb filter would increase the power of the random noise. Thus, when the co-channel interference does not occur, a use of the comb filter may unnecessarily result in a deterioration of the picture quality. Accordingly, an apparatus for judging if co-channel interference exists in a digital TV receiver is disclosed in co-pending application Ser. No. 09/207,263 entitled "Method and apparatus for determining co-channel interference in digital television system," fully incorporated herein.

In the co-pending application, a determination is made whether a co-channel NTSC interference exists before the sync recovery unit 14 outputs the recovered sync signals to the. equalization & ECC unit 15. If a co-channel NTSC interference does not exist, data bypassing a comb filter is output to the equalization & ECC unit 15. If a co-channel NTSC interference is determined to exist, a comb-filtered data is output to the equalization & ECC unit 15.

However, because terrestrial broadcasting signals such as DTV and NTSC broadcasting signals are transmitted through space, the signals are exposed to various types of noises and may be significantly attenuated by such noises. The noise which is picked up by a channel during transmission is a Gaussian noise. The power of the Gaussian noise is generally constant, but may sometimes surge to a large value. In such cases, the Gaussian noise may be determined to be a co-channel NTSC interference causing the data to pass a comb filter before being output to the equalization and error code correction unit 15. In contrast, a NTSC interference may be judged not to exist by the apparatus disclosed in the co-pending application due to the noise even if the a severe NTSC interference does exist. If data which passed or did not pass the comb filter is incorrectly selected and output, the operation of equalization & ECC unit 15 would be adversely affected. Therefore, circuits removing noisy signals contained in the incoming digital signals are affected, causing a malfunction of the DTV receiver.

SUMMARY OF THE INVENTION

Accordingly, an object of the present invention is to solve at least the problems and disadvantages of the related art.

An object of the present invention is to provide an apparatus for judging if co-channel interference exists in a DTV receiver and varying the point in time to turn a filter for removing the NTSC co-channel interference on/off.

Another object of the present invention is to provide an apparatus for judging if co-channel interference exists in a DTV receiver, in which a Gaussian noise is not misrecognized as the NTSC co-channel interference.

A still another object of the present invention is to provide an apparatus for judging if co-channel interference exists in a DTV receiver, in which a constant size of noise is output.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, an apparatus for judging if co-channel interference exists in a DTV receiver includes obtaining the MSE of a noise which did not pass To through a comb filter, controlling its gain and comparing the MSE with a MSE of a noise which passed through a comb filter, to turn the comb filter on/off according to the compared result.

BRIEF DESCRIPTION OF THE ATTACHED DRAWINGS

The invention will be described in detail with reference to the following drawings in which like reference numerals refer to like elements wherein.

DETAILED DESCRIPTION OF PREFERRED EMBODIMENT

Reference will now be made in detail to the preferred embodiments of the present invention, examples of which are illustrated in the accompanying drawings.

Figure 1:
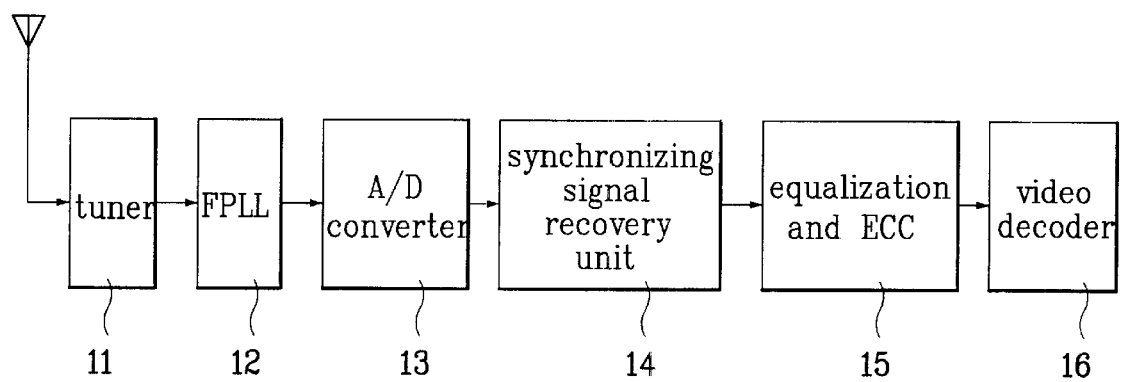
FIG. 1 is a block diagram of a digital TV receiver in the related art.
Figure 2:
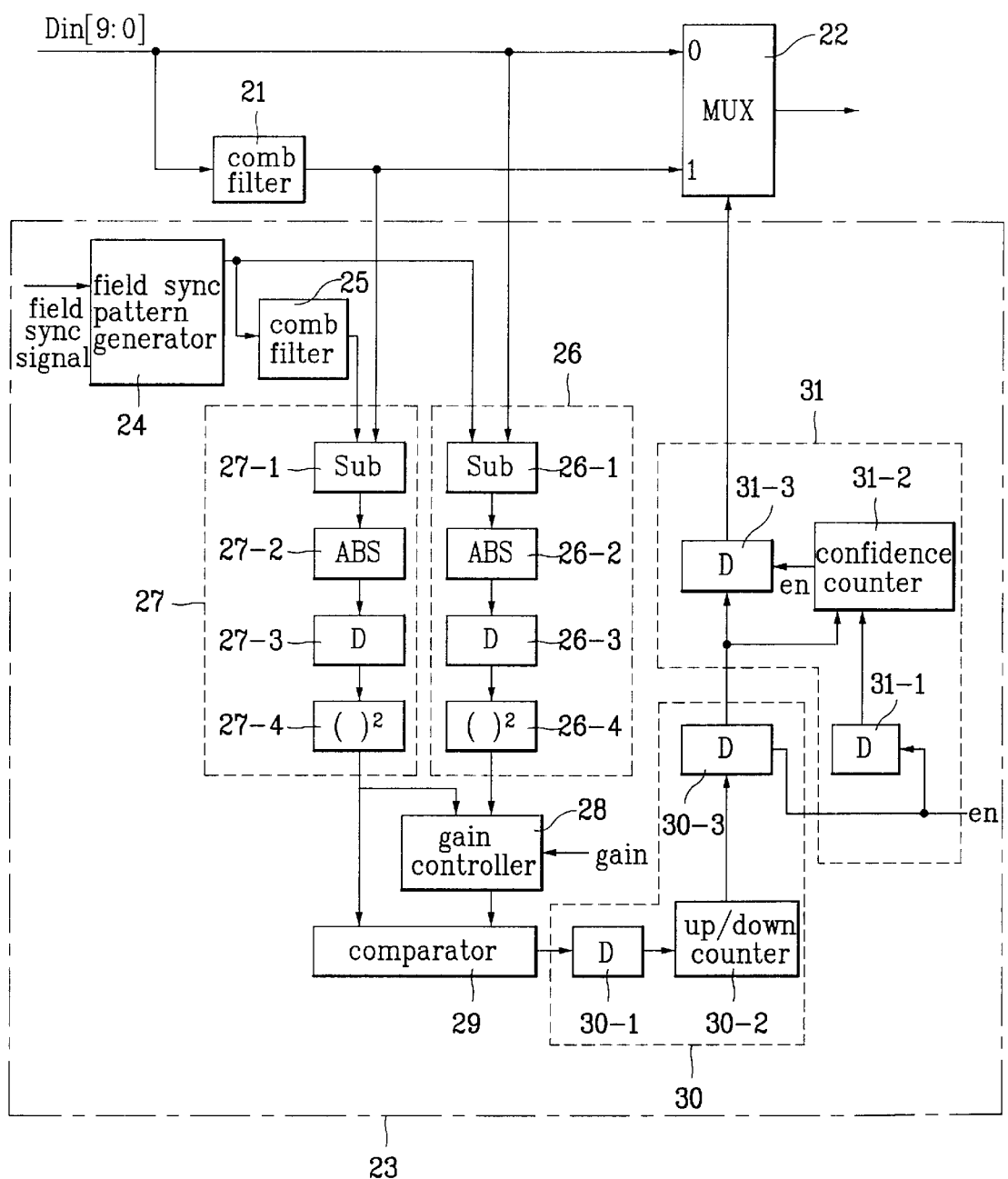
FIG. 2 is a block diagram of an apparatus for judging if co-channel interference exists in a DTV receiver according to the present invention.

FIG. 2 is a partial block diagram of a digital TV receiver including an apparatus according to the present invention for judging if co-channel interference exists in a DTV receiver. Referring to FIG. 2, the digital receiver includes a comb filter 21 which removes the NTSC interference in the input data; a multiplexer (MUX) 22 which selectively outputs either data passed through the comb filter 21 or data which bypassed the comb filter 21, according to a selection signal; and a co-channel interference judging unit 23 which judges if the NTSC co-channel interference exists, generates the selection signal according to the judged result and sends the selection signal to the MUX 22.

The co-channel interference judging unit 23 includes a field sync pattern generator 24 which generates a reference field sync signal pattern; a comb filter 25 which removes the NTSC interference of the reference field sync signal generated by field sync pattern generator 24; a first MSE generator 27 which obtains the MSE of the difference between a comb filtered field sync signal and the comb filtered reference field sync signal; a second MSE generator 26 which obtains the MSE of the difference between the field sync signal and the reference field sync signal; a gain controller 28 which controls the gain of the second MSE obtained by second MSE generator 26 according to a predetermined gain; a comparator 29 which compares the magnitude of the first MSE generated by the first MSE generator 27 with the second MSE whose gain is controlled by the gain controller 28; a first counter 30 which is reset for each field and counts up or down according to the result of the comparator 29; and a second counter 31 which checks the confidence of the count value output by the first counter 30 and sends a selection signal based upon the count value to control the MUX 22. If the two MSEs are equal, either the comb filtered data or the input data may be output, but in the preferred embodiment, the second counter 31 produces a signal selecting the comb filtered data.

The first MSE generator 27 includes a subtracter 27-1 finding a difference between the comb filtered field sync signal from the comb filter 21 and a comb filtered reference field sync signal from the comb filter 25; an absolute value operating unit 27-2 obtaining a magnitude of the output from the subtracter 27-1; a D flip-flop 27-3 performing timing alignment with respect to the output from the absolute value operating unit 27-2; and a square operating unit 27-4 squaring and outputting the time-aligned magnitude as a first MSE.

Similarly, the second MSE generator 26 includes a subtracter 26-1 finding a difference between the field sync signal and the reference field sync signal, an absolute value operating unit 26-2 obtaining a magnitude of the output from the subtracter 26-1, a D flip-flop 26-3 performing timing alignment with respect to the output from the absolute value operating unit 26-2, and a square operating unit 26-4 squaring and outputting the time-aligned magnitude as a second MSE. A comparator 29 compares the size of the first MSE to the gain controlled second MSE and to produces a signal corresponding to the size of the noise.

Also, the first counter 30 includes a D flip-flop 30-1 which performs timing alignment with respect to the output from the comparator 29; an up/down counter 30-2 which is reset for each field to perform an up/down counting in response to a value of data output from the D flip-flop 30-1; and a D flip-flop 30-3 which stores a predetermined bit of data produced from the up/down counter 30-2 according to an external enable signal en1.

The second counter 31 includes a D flip-flop 31-1 which generates an enable signal en2 one clock period later than the enable signal en1; a confidence counter 31-2 activated by the enable signal en2 from the D flip-flop 31-1, inspecting the reliability of the output signal of the D flip-flop 31-1 and producing an enable signal en3 if the reliability has a maximum; and a D flip-flop 31-3 activated by the enable signal en3. The D flip-flop 31-3 temporarily delays the signal output by the D flip-flop 31-1 and outputs a selection. signal to the multiplexer 22 upon being activated by the enable signal en3.

The operation of the present invention will be discussed next. For purposes of the illustration, it will be assumed that an A/D converter converted the input signal into a digital data of 10 bits. Accordingly, the 10-bit digital data Din [9:0] is directly output to the MUX 22 and to the comb filter 21. The comb filter 21 removes the NTSC elements from Din [9:0] and outputs the filtered data to the MUX 22.

The MUX 22 either directly outputs the 10-bit digital data in response to the selection signal or outputs the comb filtered data from the comb filter 21. The MUX 22 outputs the comb filtered data if a NTSC channel interference exists, and otherwise, outputs data that has not passed comb filter 21. As discussed above, the co-channel interference judging unit 23 determines whether or not a NTSC channel interference exists and sends a selection signal to the MUX 22.

Particularly, a determination as to whether a co-channel NTSC interference exist may be made utilizing the field sync signal which has a predetermined sequence of symbols. Thus, the determination is made after a sync signal recovery unit restores the field sync sign 1. Namely, the field sync signal is one data segment length including the segment data signal pattern of four symbols '1001'; the pseudo random sequence PN511, PN63, PN63, and PN63; the VSB mode information of 24 symbols; and a reserved region. Accordingly the field sync pattern generator 24 may produce the pattern of a reference field sync signal pattern upon receiving the field signal. In the preferred embodiment of the present invention, the PN511 symbols are utilized in determining whether a co-channel NTSC interference exist. Thus, the field sync pattern generator 24 generates a predetermined pattern of PN511 symbols.

After the generation of the reference field sync signal pattern, the subtracter 26-1 of the second MSE generator 26 obtains the difference between the reference field sync signal generated by the field sync signal pattern generator 24 and the field sync signal received through a sync signal recovery unit. The field sync signal received through the sync signal recovers unit contains noise added during the transmission through the channel. This noise may include a co-channel NTSC interference.

Therefore, the output signal of the subtracter 26-1 is essentially the noise remaining after the removal of the reference field sync signal from the input field sync signal. Because the value may be positive or negative, the absolute value operating unit 26-2 obtains a magnitude of the output from the subtracter 26-1 and performs timing alignment with respect to the magnitude through the D flip-flop 26-3. The square operating unit 26-4 squares the time aligned magnitude to differentiate the noise. The output of the square operating unit 26-4 is input to the gain controller 28

The data containing the field sync signal and the reference field sync signal are respectively filtered in the comb filter 21 and the comb filter 25 to remove the co-channel NTSC interference. The output signals of the two comb filters 21 and 24 are then input to the subtracter 27-1 of first MSE generator 27 which obtains the difference between the filtered reference field sync signal pattern and the filtered field sync signal. Because the co-channel NTSC interference has already been removed, the output 0 the subtracter 27-1 is essentially the Gaussian noise remaining g after the removal of the reference field sync signal from the input field sync signal. The power level added by the Gaussian noise may be doubled after passing through the comb filter 21. Analogous to the second MSE generator 26, the magnitude of the output of the subtracter 27-1 is obtained by the absolute value operating unit 27-2 and time-aligned through the D flip-flop 27-3. The square operating unit 27-4 squares the time-aligned magnitude and inputs the value to the comparator 29.

If the magnitude of the gain set by the gain controller 28 is '1', the second MSE obtained by the second MSE generator 26 is output to the comparator 29 without change. The comparator 29 compares the magnitude of the first and second MSEs from the square operating unit 7-4 and the gain controller 28 to judge if the NTSC co-channel interference exists. If there is no co-channel NTSC interference, the output of the first MSE generator 27, i.e. the MSE of the noise which passed through the comb filter, would be larger than the output of the square operating unit 26-4. This is because the Gaussian noise doubles after passing the comb filter 21. On the other hand, if there is co-channel NTSC interference, the output of the square operating unit 26, i.e. the MSE of the noise which did not pass through the comb filter would be larger than the output of the MSE 27. The reason being that the co-channel NTSC interference is still larger than the Gaussia noise even if the Gaussian noise were to be doubled.

The comparator 29 transmits the result to the up/down counter 30-2 after a timing alignment through the D flip-flop 30-1 of the first counter 30. The first counter 30 is used to prevent a Gaussian noise with large instantaneous value from being mistaken for a co-channel NTSC interference when there is no co-channel NTSC interference. The up/down counter 30-2 is reset for each field, i.e. at the initial stage of each field sync signal when the PN511 symbols of the field sync signal begins.

When the results of the comparator 29 indicate that the MSE of the noise that passed the comb filter 21 is larger than the MSE of the noise that has not passed the filter, the up/down counter 30-2 considers that there is no co-channel NTSC interference and counts down by one value. When the MSE of the noise that passed the comb filter 21 is smaller than the MSE of the noise that has n t passed the filter, the up/down counter 30-2 considers that there is a co-channel NTSC interference and counts up by one value.

In the preferred embodiment, the up/down counter 20-2 counts for 511 symbols, an as a result an occasional instantaneous surge of the Gaussian noise does not affect the overall determination of whether a co-channel NTSC interference exists. When the up/down counter 30-2 counts for 511 symbols, the count value increases if there is a co-channel NTSC interference and the count value decreases if there is no co-channel NTSC interference. Depending g on the count value, the up/down counter 30-2 outputs the most significant bit to the D flip-flop 30-3. Particularly, if there is a co-channel NTSC interference, the up/down counter 30-2 outputs a "0", and otherwise outputs a "1". The output of the up/ down counter 30-2 is simultaneously output to the confidence counter 31-2 and the flip flop 31-3 of second counter 31.

If the two MSEs received by the comparator 29 are close in magnitude, the up/do n counter 30-2 would produce both "0" and "1" repeatedly for each field sync signal. As a result, the MUX 22 would alternately output data that has and has not passed the comb filter 21, which adversely affects the operation of an equalization and ECC unit. In order to accommodate this circumstance, the second counter 31 is utilized. Namely, the probability of generation MSEs of close magnitudes is high in an area where the digit TV broadcasting and NTSC TV broadcasting coincide. In such case, the data which passed through comb filter 21 is output in order to improve the performance of the system and this operation i., performed by second counter 31.

The confidence counter 31-2 of second counter 31 is enabled 1-clock period later than the D flip-flop 30-3 of the first counter 30 by the D flip-flop 31-1. Thus, when the confidence counter 31-2 is enabled, the data stored in the D flip-flop 30-3 is input to the confidence counter 31-2.

The confidence counter 31-2 determines that there is no co-channel NTSC interference if the MSE of the noise that passed the comb filter 21 is larger than the MSE of the noise that has not passed the filter. Namely, if "1" is output from the first counter 30, the confidence counter 31-2 decreases the reliability by one step. If the ISE of the noise that passed comb filter 21 is smaller than the MSE of the noise that has not passed comb filter 21, the confidence counter 31-2 determines that there is co-channel NTSC interference. Namely if "0" is output from the first counter 30, the confidence counter 31-2 increases the reliability by at least two steps rather than one.

For example, assume that the MSE of the noise that passed the comb filter 21 alternatively is smaller and greater than the MSE of the noise that has not passed the comb filter 21, and assume the reliability accumulated in the confidence counter 31-2 is "0." Also, assume that the increment of the reliability of confidence counter 31-2 is "16" and the decrement is "−1".

If the MSE of the noise that passed the comb filter 21 is smaller than the MSE of the noise that has not passed the comb filter 21, the D flip-flop 30-3 produces "0" and the reliability of the confidence counter 31-2 becomes "16". If the MSE of the noise that has not passed the comb filter 21 is smaller than the MSE of the noise that passed the comb filter 21, the D flip-flop 30-3 produces "1" and the reliability of the confidence counter 31-2 is decreased by "1" resulting in "15." If the MSE of the noise that passed the comb filter 21 is again smaller than the MSE of the noise that has not passed the comb filter 21 in the next field sync signal section, the D flip-flop 30-3 would produce "0" and the reliability of confidence counter 402 is increased by "16" to a value of "31."

The reliability of the confidence counter 31-2 in the next successive field sync signal sections would be reduced to "30," "46," "45," and so forth. Accordingly, the reliability stored in the confidence counter 31-2 keeps on increasing and when the count value of the confidence counter 31-2 reaches a predetermined value, the confidence counter 31-2 enables the D flip-flop 31-3. Once the confidence counter 31-2 reaches the predetermined value, the confidence counter 31-2 continues to output the enable signal en3 to the D flip-flop, even if the MSE of the noise that ha not passed comb filter 21 were to diminish such that the reliability of the confidence counter 31-2 becomes "0."

As a result, even if the size of the co-channel NTSC interference and the Gaussian noise is similar producing a similar MSE values, after a given time period elapses, the reliability of the confidence counter 31-2 becomes a high value and the D flip-flop 31-3 outputs a "0" to the MUX 22. Therefore, when the MSEs of the two noises input to the comparator 29 are similar, the MUX 29 selects and produces data that passed the comb filter 21 based upon the control of the second counter 31.

Particularly, the comparator 29 uses the MSE obtained by the second MSE generator 26 as a basis for judging if the NTSC interference exists. However, the MSE may be changed when noise other than the NTSC co-channel interference exist in the channel or may vary with the kind of picture.

As described above, the second MSE obtained by second MSE generator 26 is affected by noises, the NTSC co-channel interference and the kind of picture. Also, a change in the second MSE may invert the result of the comparator 29, thereby varying the point in time for turning the comb filter 21 on/off. For example, a NTSC interference may be judged not to exist when the second MSE value changes due to the influence of noises, even if severe NTSC interference exists. As a result, error may be generated in the receiver if the comb filter 21 is not turned on. In such case, the err or can be removed by turning on the comb filter 21 and this operation is carried out by the gain controller 28.

The second MSE obtained by the second MSE generator 26 is output to the comparator 29 without change when the magnitude of gain set in the gaixdn controller 28 corresponds to '1.' A smaller value of the second MSE is output to the comparator 29 when the gain is smaller than '1.' Thus, the MUX 22 would output the signal which did no pass through the comb filter 21 even if the magnitude of the NTSC co-channel interference becomes larger in the received signal This means a delay of the point in time for turning on the comb filter 21.

On the contrary, hen the magnitude of the gain set in the gain controller 28 is larger than '1,' the second MSE is changed to a larger value and output to the comparator 29. Accordingly, the MUX 22 would output the signal which passed through the comb filter 21 even if the magnitude of the NTSC co-channel interference becomes relatively small. In this case, the point in time for turning on the comb filter 21 advances. That is, the comb filter 21 is turned on sooner for a gain greater than '1' as compared to when the gain is '1'.

Accordingly, in the preferred embodiment of the present invention, the magnitude of gain in the gain controller 28 is set to be larger than '1,' thereby advancing the point in time for turning on/off comb filter 21. This is because the performance of the receiver increases if the comb filter is turned on when the NTSC co-channel interference exists. The particular value of the gain may be set by a system operator according to the needs of the digital TV receiver.

In an alternate embodiment, a gain controller may also be implemented to control the gain of the MSE output by the first MSE generator 27, or a gain controller may be implemented to control the gain of the MSE output by the first MSE generator rather than the second MSE generator 26. If a gain controller to control the gain of the MSE output by the first MSE generator 27 is implemented rather than the gain controller 28, a smaller value of the first SE would be output to the comparator 29 when a gain is smaller than '1,' and a larger value of the first MSE would be output to he comparator 29 when a gain is larger than '1.' In such case, gain value of less than '1' would advance the point in time for turning on the comb filter 21 and a gain value of greater than '1' would be-delay the point in time for turning on the comb filter 21. Analogous to the implementation of the gain controller 28, the magnitude of gain in the gain controller for the first MSE generator 27 would be less than '1' to advance the point in time for turning on/off comb filter 21.

As described above, the present invention gives a weight to turn on the comb filter 21 sooner when the NTSC co-channel interference exists, optimizing the performance of the receiver.

In sum, in the apparatus for judging if the co-channel interference exists in the digital TV receiver of the present invention, the gain of the MSE of noise which did not pass through a comb filter is controlled to change the point in time for turning on/off the comb filter, thereby optimizing the performance of the receiver. Moreover, the MSE of noise which passed through a comb filter and the MSE of noise which did not pass through the comb filter are compared, and an up/down counter and a confidence counter are used to judge if the NTSC co-channel interference exists, preventing a misrecognition of the Gaussian noise having a large instantaneous value as the NTSC co-channel interference. Furthermore, when the MSE of noise which passed through a comb filter and the MSE of noise which did not pass through the comb filter are similar, the data which passed through the comb filter is output, improving the performance of the system.

The foregoing embodiments are merely exemplary and are not to be construed as limiting the present invention. The present teachings can be readily applied to other types of apparatuses. The description of the present invention is intended to be illustrative, and no to limit the scope of the claims. Many alternatives, modifications, and variations will be apparent to those skilled in the art.

What is claimed is:

1. An apparatus for judging if co-channel interference exists in a digital TV receiver comprising:
    a first MSE generator which obtains a first MSE of a noise in an input data;
    a second MSE generator which obtains a second MSE of a comb filtered noise in the input data;
    a gain controller which controls a gain of either the first MSE or the second MSE; and
    a comparator which compares either a magnitude of the second MSE and a magnitude of the gain controlled first MSE or a magnitude of the gain controlled second MSE and a magnitude of the first MSE, and outputs a signal indicating whether the co-channel interference exists.

2. An apparatus of claim 1, wherein the gain controller controls the first SE and the comparator compares a magnitude of the second MSE and a magnitude of the gain controlled first MSE.

3. An apparatus of claim 1, wherein the first MSE generator obtains a first difference between an input field sync signal and a reference field sync signal, obtains a first magnitude of the first difference, performs timing alignment with respect to the firs magnitude, squares the time-aligned first magnitude and outputs the squared time-aligned first magnitude as the first MSE.

4. An apparatus of claim 1, wherein the second MSE generator obtains a second difference between a comb filtered input field sync signal and a comb filtered reference field sync signal, obtains a second magnitude of the second difference, performs timing alignment with respect to the second magnitude, squares the time-aligned second magnitude and outputs the squared time-aligned second magnitude as the second MSE.

5. An apparatus of claim 1, wherein the magnitude of said gain is at least '1.'.

6. An apparatus of claim 1, further comprising:
    a first counter which counts up or down according to the signal output by the comparator for a predetermined number of symbols, and outputs a most significant bit data according to the count value, wherein the most significant bit data indicates whether the co-channel interference exists.

7. An apparatus of claim 1, further comprising:
    a first counter which counts up or down according to the signal output by the comparator for a predetermined number of symbols, and outputs most significant bit data according to the count value; and
    a second counted which receives the most significant bit data and counts up or down a reliability count value according to the most significant bit data, said second counter outputting a control signal selecting data which passes through a comb filter if the reliability count value meets a predetermined threshold and otherwise, outputting a control signal selecting data which bypasses a comb filter.

8. An apparatus of claim 7, wherein the second counter counts the reliability count value by a count-up value different from a count-down value.

9. An apparatus of claim 8, wherein one of either the count-up or count-down value is at least two, while the other count-down or count-up value is equivalent to one.

10. A method for judging if co-channel interference exists in a digital TV receiver comprising:
    (a) obtaining a first MSE of a noise in an input data;
    (b) obtaining a second MSE of a comb filtered noise in the input data;
    (c) controlling a gain of either the first MSE or the second MSE; and
    (d) comparing either a magnitude of the second MSE and a magnitude of the gain controlled first MSE or a magnitude of the gain controlled second MSE and a magnitude of the first MSE, and outputting a control signal indicating whether the co-channel interference exists.

11. A method of claim 10, wherein in (c) controlling a gain of the first MSE and in (d) comparing a magnitude of the second MSE and a magnitude a the gain controlled first MSE.

12. A method of claim 10, wherein (a) comprises:
    obtaining a first difference between an input field sync signal and a reference field sync signal;
    obtaining a first magnitude of the first difference;
    performing timing alignment with respect to the first magnitude;
    squaring the time-aligned first magnitude and outputting the squared time-aligned first magnitude as the first MSE.

13. A method of claim 10, wherein (b) comprises:
    obtaining a second difference between a comb filtered input field sync signal and a comb filtered reference field sync signal;
    obtaining a second magnitude of the second difference;
    performing timing alignment with respect to the second magnitude;
    squaring the time-aligned second magnitude and outputting the squared time-aligned second magnitude as the second MSE.

14. A method of claim 10, wherein the magnitude of said gain is at least 'p1.'.

15. A method of claim 10, further comprising:
    counting up or c own according to the control signal for a predetermined number of symbols; and outputting a most significant bit data according to the count value, wherein the most significant bit data indicates whether the co-channel interference exists.

16. A method of claim 10, further comprising:

counting up or own according to the control signal for a predetermined number of symbols, and outputting a most significant bit data according to the count value; and counting a reliability value up or down according to the most significant bit data, and outputting a selection signal selecting data which passes through a comb filter if the reliability count value meets a predetermined threshold and otherwise, outputting a selection signal selecting data which bypasses a comb filter.

17. A method of claim 16, wherein the reliability count value by a count-up value different from a count-down value.

18. A method of claim 17, wherein one of either the reliability count-up or count-down value is at least two, while the other reliability count-down or count-up value is equivalent to one.

19. A digital TV receiver comprising:

an antenna which receives input data signals;

a tuner which selects a signal of desired channel from the received data signal and changes the selected signal to an intermediate frequency signal;

a FPLL circuit which demodulates the intermediate frequency signal into baseband-signals I and Q, and locks the frequency and the phase of the intermediate frequency signal;

an A/D converter which converts the I signal into a digital signal of a given bit number;

a sync recovery unit which detects a segment data signal and a field sync signal from the digital data;

a comb filter filtering the field sync signal;

an apparatus for judging if co-channel interference exists which obtains first MSE of a difference between the field sync signal and a reference field sync signal, obtains a second MSE of a difference between a comb filtered field sync signal and a comb filtered reference field sync signal, controls a gain of the first MSE, compares a magnitude of the second MSE and a magnitude of the gain controlled first MSE, and outputs a control signal based upon the comparison; and a MUX which receives the digital data from the A/D converter and a comb filtered digital data from the comb filter, said MUX selecting and outputting one of either the comb filtered digital data or the digital data according to the control signal.

20. An apparatus of claim 19, wherein the magnitude of said gain in the apparatus for judging if co-channel interference exists is at least '1.'.

* * * * *